US012574353B2

(12) United States Patent
Karpowicz et al.

(10) Patent No.: US 12,574,353 B2
(45) Date of Patent: Mar. 10, 2026

(54) METHOD AND UNIT FOR ADAPTIVE CREATION OF NETWORK TRAFFIC FILTERING RULES ON A NETWORK DEVICE THAT AUTONOMOUSLY DETECTS ANOMALIES AND AUTOMATICALLY MITIGATES VOLUMETRIC (DDoS) ATTACKS

(71) Applicant: Naukowa i Akademicka Sieć Komputerowa—Państwowy Instytut Badawczy, Warsaw (PL)

(72) Inventors: Michał Karpowicz, Warsaw (PL); Michał Getka, Warsaw (PL); Arkadiusz Piórkowski, Warsaw (PL)

(73) Assignee: Naukowa i Akademicka Siec Komputerowa—Panstwowy Instytut Badawczy, Waszawa (PL)

( * ) Notice: Subject to any disclaimer, the term of this patent is extended or adjusted under 35 U.S.C. 154(b) by 0 days.

(21) Appl. No.: 17/775,709

(22) PCT Filed: Nov. 15, 2019

(86) PCT No.: PCT/PL2019/050064
§ 371 (c)(1),
(2) Date: May 10, 2022

(87) PCT Pub. No.: WO2021/096374
PCT Pub. Date: May 20, 2021

(65) Prior Publication Data
US 2022/0407841 A1      Dec. 22, 2022

(51) Int. Cl.
*H04L 9/40*          (2022.01)
(52) U.S. Cl.
CPC ...... *H04L 63/0263* (2013.01); *H04L 63/1458* (2013.01)

(58) Field of Classification Search
CPC ............. H04L 63/0263; H04L 63/1458; H04L 2463/141
See application file for complete search history.

(56) References Cited

U.S. PATENT DOCUMENTS 7,120,931 B1    10/2006  Cheriton
8,151,341 B1 *   4/2012  Gudov ................ H04L 63/0263
                                                726/13
(Continued)

FOREIGN PATENT DOCUMENTS

EP          3253025  A1    12/2017
WO     2017065627  A1     4/2017

OTHER PUBLICATIONS

International Search Report dated May 20, 2021 in parent International application PCT/PL2019/050064.
(Continued)

*Primary Examiner* — Daniel B Potratz
*Assistant Examiner* — Matthias Habtegeorgis
(74) *Attorney, Agent, or Firm* — Polson Intellectual Property Law P.C.; Margaret Polson; Christopher Sylvain

(57)          ABSTRACT

The subject of the invention is the method of adaptive creating network traffic filtering rules on a network device that autonomously detects anomalies and adaptively mitigates volumetric (DDoS) attacks on at least one network device (4) based on actual network flows (3) and after separating them into isolated packet flows (9), recognizes potentially harmful network flows, and then configures or tunes the network filters (19) and packet policing means (17), wherein filtering rules (18) can be propagated to other network devices (27) and selects for further analysis the isolated packet flows (9) associated with at least one configured or tuned network filter (19).

17 Claims, 9 Drawing Sheets

(56) References Cited

U.S. PATENT DOCUMENTS

| | | | |
|---|---|---|---|
| 8,234,401 | B2 | 7/2012 | Bettink et al. |
| 8,307,430 | B1 | 11/2012 | Chen et al. |
| 10,122,740 | B1 | 11/2018 | Finkelshtein et al. |
| 2004/0250124 | A1* | 12/2004 | Chesla .................. G06F 21/552 709/224 |
| 2016/0028763 | A1 | 1/2016 | Cruz Mota et al. |
| 2017/0279835 | A1 | 9/2017 | Di Pietro et al. |
| 2018/0152466 | A1* | 5/2018 | Sartran ............... H04L 63/1416 |
| 2018/0152474 | A1 | 5/2018 | Winquist et al. |
| 2018/0241762 | A1 | 8/2018 | Savalle et al. |
| 2019/0098043 | A1* | 3/2019 | Banerjee ................ G06N 20/00 |
| 2021/0099473 | A1* | 4/2021 | Fainberg ............. H04L 63/1425 |

OTHER PUBLICATIONS

Written Opinion of the International Searching Authority dated May 20, 2021 in parent International application PCT/PL2019/050064.

* cited by examiner

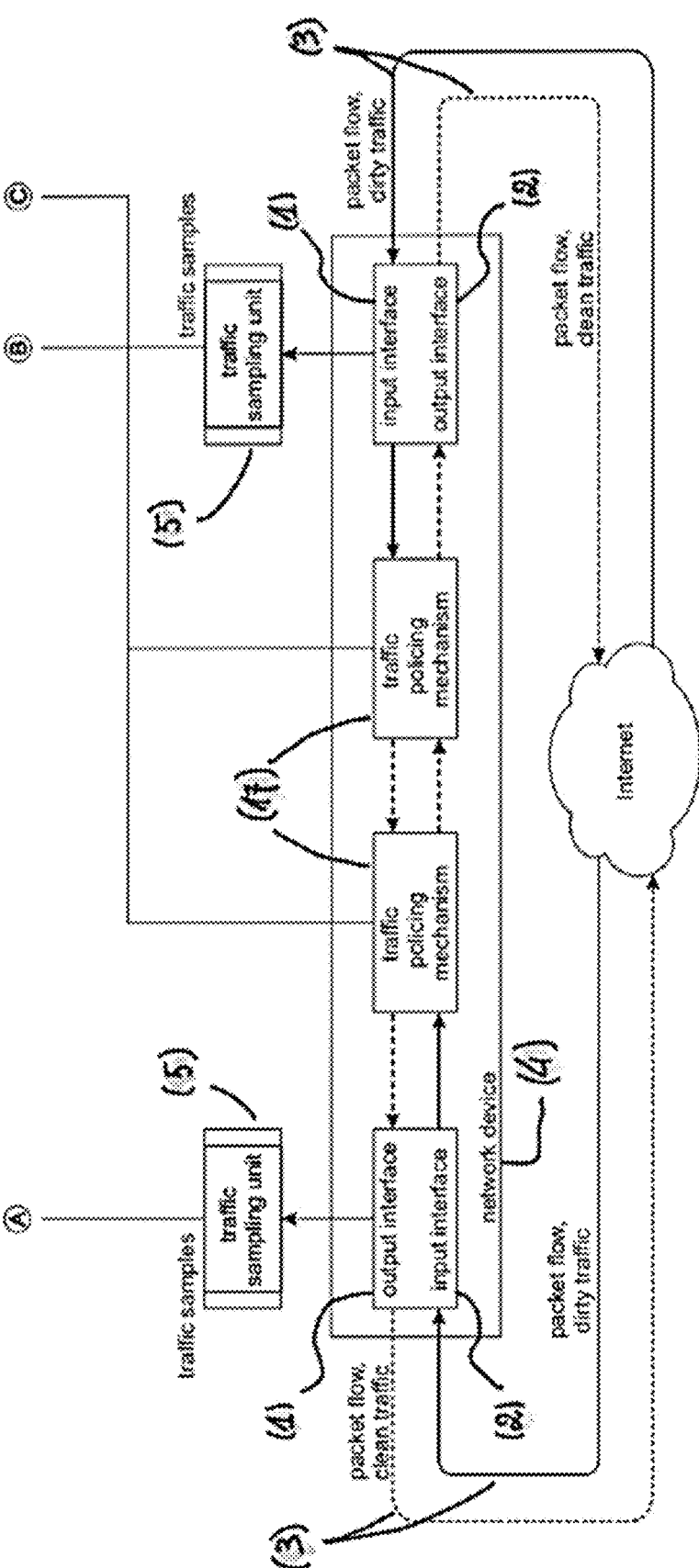
FIG. 2 (continuation)

1

METHOD AND UNIT FOR ADAPTIVE CREATION OF NETWORK TRAFFIC FILTERING RULES ON A NETWORK DEVICE THAT AUTONOMOUSLY DETECTS ANOMALIES AND AUTOMATICALLY MITIGATES VOLUMETRIC (DDoS) ATTACKS

TECHNICAL FIELD

The invention relates to a method and system for adaptive creation of network traffic filtering rules on network devices. The method autonomously detects and mitigates traffic disturbances, in particular, distributed denial of service (DDoS) volumetric attacks. The method relates to the use of the existing network infrastructure, after necessary modifications related to the application of the system according to the invention, to protect said infrastructure against the risks associated with network congestion due to exceeding the data transfer capacity on the infrastructure in which the system is used.

This solution is an adaptive (supervised learning) control system, which automatically and autonomously detects, tracks, isolates and mitigates multidimensional and time-varying network traffic disturbances caused by DDoS volumetric attacks. The solution makes the protected network immune to the attacks by analyzing signal representations of packet flows both in time and frequency domain and by carrying out adaptive synthesis of control algorithms continuously adjusting traffic flow rates. The control process is carried out by the flow observer unit.

BACKGROUND OF THE INVENTION

Cybersecurity is directly related to the technical solutions behind the method of organizing communication in existing ICT systems, in particular, in computer networks. Most common threats are related to the intentional and hostile use of existing protocols and the basic vulnerabilities of widely available network services. These vulnerabilities include, firstly, the naturally occurring asymmetry between the size of the request to the server and the size of the response from the server, and, secondly, the naturally limited performance of state protocol support mechanisms, in particular, TCP. The use of commonly known and generally available network mechanisms enables effective construction of many diversified variants of DDoS volumetric attacks. For this reason, an increase of the number of attacks simultaneously targeting multiple targets is predicted and at the same time exploiting multiple vulnerabilities, i.e. multidimensional attacks of composite dynamics.

Reports describing the landscape of ICT security in the world prove that DDoS attacks are the dominant threat for the market of network services, such as telnet, http, https, dns or gaming services. The number of attacks is increasing year by year, together with the rate of attacks measured in bits per second (bps) and packets per second (pps). Current data also shows the increasing complexity of attack dynamics. The vast majority of DDoS attacks lasts no longer than 30 minutes, with attacks lasting less than 5 minutes that dominate among them. These results define the response time requirements to be met by attack detection systems and cybersecurity incident response teams (CERT/CSIRT).

Botnets, i.e. networks of computers (bots) infected with software designed to carry out a coordinated attack according to a specific scenario, remain the basic tool for attack implementation. The sophistication of algorithms used by bots to mask presence, coordination and multidimensional attacks should be expected to increase.

Currently used methods of detecting DDoS attacks use signature-based (aka rule-based) mechanisms, which compare the content of network packets or statistical features of flows with the library of patterns of known attacks. The attack signatures usually describe:

statistical distribution of selected packet attributes (from the sample defined by the initial learning period),
  allowed source or target addresses (values of packet attributes),
  valid packet frame structure or packet data content (often only after decryption).

Network traffic anomalies are detected in rule-based (signature-based) systems either by packet pattern matching mechanisms, or mechanism signaling violation of predefined traffic activity thresholds or standards. A network flow is usually identified by only five network packet parameters. These are: source IP address, destination IP address, source port, destination port and protocol identifier. The effectiveness of such solutions depends on validity of attack pattern databases and accuracy of clean traffic descriptions.

Gathering knowledge about such patterns is important and necessary, but it requires a long-term learning process. Pattern matching is also a computationally intensive process that may significantly limit data processing capacity. The rule-based approach is based on the assumption that the dynamics of protected and attacking systems are slower than the process of learning patterns.

Systems used so far, after detecting an attack (using the signature-based method), usually redirect disturbed traffic to a separate network or cloud in order to clean it, or completely block the dirty packet flow. The disadvantage of this solution is long response time to the attack, resulting from the propagation of routing rules in the network, and cutting off clean network connections in dirty traffic. As a result, paradoxically, it may contribute to increasing the effectiveness of a detected attack.

STATE OF ART

There are many known solutions for detecting and mitigating volumetric attacks, but the principle of their operation differs significantly from their working principle according to the invention. The available solutions are characterized by the following functional features:

detection of attacks solely based on their known signatures (known patterns),
  protection of only selected and defined network addresses,
  total rejection (dumping) of packets matching the attack pattern,
  cleaning of traffic outside the client's network in the cloud of the service provider,
  traffic requiring filtration is directed to an external scrubbing center (reaction time depends on the propagation of routing tables),
  deep packet inspection (viewing data stored in OSI application layer fields),
  only addresses that are strictly defined and specified by the operator are protected,
  lack of rules of adaptive feedback control of the settings for policers/shapers (this degrades the accuracy of allocation of link resources or makes it completely impossible to regulate the speed of flows),
  lack of mechanisms predicting the rate of isolated flows, lack of mechanisms for automatic calculation of safe allocations of link resources to flows, lack of digital signal processing mechanisms (processing of signals representing packet flows), execution of tasks in a strictly defined network environment (no possibility to implement a solution based on selected protocols of communication with devices or distribution of filtration rules), a fixed protocol for recording packet filtering rules.

There is a solution in the state of art, shown in the EP3253025 application. According to this method, the controller collects statistical data on network traffic from the first device transmitting network packets. If the global statistics of the network traffic flowing to the target IP address exceeds the specified order, the controller delivers the DDoS prevention policy packets to the second transmitting device. Accordingly, the second device transmitting packets performs, in line with the rules specified by the controller, operations on the traffic flow to the destination network address in agreement with a given preventive policy sent by the controller. As a result, the impact of the attack is reduced and network security improved. The characteristic feature of this solution is that the distribution of filtration or routing rules fetches place after exceeding alarm thresholds determined by traffic statistics, and that identification of flows directed to a given IP address and exceeding threshold flows is performed based upon statistical analysis of data on network traffic to a given IP address.

A more advanced solution is known from the international application number WO17065627. According to this application, the method consists in carrying out the initial phase of learning with supervision during which classifiers are created as built upon the full-length network flow teaching set, which are then verified based on the teaching set with limited network flows, which makes it possible to determine a corrective model. Then, in the prediction phase, packets of unclassified network flow are received, which are reduced, and subsequently, as a result of classification according to model built in the learning phase on restricted flows, and after applying the corrective model, the results of classification are obtained. The results of this classification may be used to isolate flows that are carriers of anomalies in network traffic, characteristic, for example, of volumetric attacks.

The disadvantages of this solution are the necessity to perform a relatively long learning phase, and that the classification is built upon, among other things, statistical data for the accepted set of learners. Only in the prediction phase does the classification of the network flows observed in the network traffic take place in actual time. The analyzed network packet parameters include source address, destination address, source port and destination port, as well as the type of transmission protocol and the statistics derived from it. The effectiveness of the classification depends on the frequency of updating the prediction model.

Another solution known from the state of art is described in U.S. Ser. No. 10/122,740. The described method is conceptualized on cyclical generation of models and configurations, and their updates. The model defines the threshold for at least one of the signals. Detection of anomalies in network traffic is built upon applying the model to signal data or matching at least some of the signal data to a pattern of anomalies in traffic received from a centralized analytic server. When an anomaly is detected, the process of reducing and alleviating the anomaly fetches place. This enables dynamic and adaptive analysis of network traffic and detection of anomalies, including detection improvements independent of human intervention.

Anomaly detection is structured on the analysis of deviations from the statistical model stored on the central analytical server and on thresholds defined by the operator.

Patent application U.S. Pat. No. 8,307,430 discloses a solution based on the analysis of deviations from a given statistical model. If the spectral density of the selected parameter deviates from the uniform distribution, a decision is made about detection of an anomaly or potential attack.

The solution is based on monitoring signals with given statistical characteristics, i.e. it is a signature method.

Another known state of art solution is disclosed in document US2018 152474. Herein, one or more performance indicators associated with one or more thresholds to be configured are user-defined. Based on historical information about the traffic flow associated with previously detected malicious activity, characteristic values for one or more performance indicators are identified. Threshold values are configured automatically in accordance with identified characteristic values.

The aforementioned is a solution based on blocking the attack detected by the signature method. Attack mitigation parameters and alarm thresholds are set by the operator.

The state of art also includes US2018 241762A, which describes the solution of detecting anomalies in network traffic as created through acknowledging the difference between the new anomaly and known anomalies.

Anomaly detection based on known patterns classifies this solution as a signature model. Classification and isolation of flows is approved by the operator, who is also responsible for initiating processes to protect network resources against detected anomalies.

In addition, the solution revealed in U.S. Pat. No. 8,234, 401 is also known as state of art. It consists in adjusting the so-called policers to the order of use of monitored network resources. Moreover, the flow of network packets observed by an appropriate policer induces the order of use of monitored network resources.

The solution follows a proportional control rule using a feedback signal in the form of a load on a selected resource. The solution incorporates a single model of controlling policer work, and does not allow the shaping of a network traffic spectrum or a prediction of the value of the policer output signal. The initial value of monitor resource utilization order must be specified by the operator.

U.S. Pat. No. 7,120,931 discloses a solution for generating filters based on incoming data to a network device. In this solution, the network data of the incoming device is divided into multiple network flows. Aggregate summaries of the network flows are then created for each of the split network flows. Aggregate summaries of network flows are then sent to the flow analyzer, wherein they are analyzed for the characteristics of potentially harmful network flows. The result of the analysis is the generation or fine-tuning of a network filter for the analyzed aggregated network flow summary, which prevents potentially harmful flows from entering the network device.

Flow analysis is performed according to the compiled statistics of aggregated data on network packet attributes contained in flow samples. Increased filtration resolution is achieved according to statistical analysis after detection of anomalies in selected observed sub-flows. It is understood that a network filter, according to the cited document, is both a separator of a network flow (sub-flow) and a controller of its dynamics, i.e. attenuation of packets belonging to a selected packet flow.

The solutions known from the state of the art usually divide the analyzed network traffic into flows as built upon parameters of network packets such as: source address, target address, source port and target port, type of transmission protocol, or the statistics that are built on them. However, such a limitation is not reflected in the theoretical knowledge of network engineering.

State of art solutions do not guarantee effective detection and mitigation of anomalies in network traffic, in particular, DDoS attacks. The desired solution must be capable of tracking ever-changing sources of anomalies or changing attack vectors. The solution should also be capable of taking action in anticipation of attack scenarios in a secure and credible manner. In addition, the system should enhance the ability of the network operator to respond to observed events over a period of several seconds by preparing effective means of response to an attack, and by providing an appropriately filtered set of data (concealing the technical complexity of system).

The technical problem was solved by using formal concepts of the theory of predictive calculus and inductive reasoning (machine learning), set theory, control theory and signal processing theory, as well as by applying terminology derived from selected technical standards.

The following are formal definitions and a glossary of terms used:

A network packet is viewed as a telecommunications protocol data unit (PDU) of the OSI model. Values of fields contained in protocol headers and parameters characterizing packet transmission will jointly create the domain of knowledge-building processes. The list of network packet parameters observed in the system depends on the packet sampling standard (P. Phaal, S. Panchen, N. McKee, InMon Corporation's sFlow: A Method for Monitoring Traffic in Switched and Routed Networks, 2001, IETF, RFC 3176; B. Claise, Ed., Cisco Systems NetFlow Services Export Version 9, 2004, IETF, RFC 3954).

Let Fi, i=1, . . . , n, denote a set of numbers representing the content of available fields of network protocol headers and parameters characterizing a network packet. The Cartesian product $F=F_1 \times F_2 \times \ldots \times F_n$ will be called the domain of packet parameters' ('knowledge representation domain').

Subset of the domain of packet parameters, $F_0 \subseteq F$, reconstructed based on a set of observed network packets is 'network traffic'.

Function $a_i: F \to F_i$, i=1, . . . , n assigning a number from Fi set to packet $p \in F$ will be called a 'packet attribute'.

Subset $S_i \subseteq F_i$, i=1, . . . , n corresponding to the ai attribute will be called 'selector'.

Cartesian product of the selectors $T=S_1 \times \ldots \times S_n$ defines the term. The term consisting of a single-element selector $\hat{s}_i = (v)$ and defined by the Cartesian product $\hat{t}(i)=F_1 \times \ldots \times \hat{s}_i \times \ldots \times F_n$ determines the base term.

For any term $W=U_{j=1}^{m} T^j$ defined by the sum of the Cartesian products of selectors, the indicator function $$\delta_W(p) = \begin{pmatrix} 1, & p \in W, \\ 0, & p \notin W, \end{pmatrix}$$

specifies the packet filter.

A set of observed packets matching the pattern specified by the W term, $P(W)=(p \in F_0, \ \delta_W(p)=1) \subset F$ specifies the packet flow.

Function: g: $P(F_0) \times \Theta \to R$ specified for any subset of network packets $W \subset P(F_0)$ and the parameter $\theta \in \Theta$, determines the numerical characteristic of the flow.

Basic numerical characteristics of sets of packets observed by a given filter specify the packet flow rate expressed in bits or packets per second.

Let $h \in R$, h>0, denote the time interval during which packet samples are collected. Let us consider a selector $S_k(t)=(t-h, t) \subset F_k$ selecting the packets observed during the sampling period (t–h, t) prior to moment $t \in R$ and the term $$W(t)=U_{j=1}^{m}(S_1^{j} \times \ldots \times S_k(t) \times \ldots \times S_n^{j})$$

If U stands for a set of configuration parameters of packet rate limiters (policers, shapers) of a (firewall type) network device, then the control rule $\mu_W: R^m \to U$ corresponding to the term W assigns the configuration parameters of the network device to the vector of numerical flow characteristics, and the control algorithm calculates the value of the control rule.

Let $g(P(W))=(g_1(P(W)), \ldots, g_m(P(W)))^T \in R^m$ denote the vector of numerical flow characteristics P[W]. A filter rule assigns a control rule to packets belonging to a specific flow: $\bigwedge_{p \in F} p \in P(W) \to \mu_W(g(P(W)))$.

The flow dynamics model is a sequence of functions $(f_t, h_t)_{t=t_0}^{\infty}$ describing the time evolution of the numerical flow characteristics according to the following system of difference equations:

$$x(t+1)=f_t(x(t),u(t),v(t),\theta),x(t_0)=x_0$$

$$y(t)=h_t(x(t),u(t),e(t),\theta)$$

$$t=t_0,t_0+1,t_0+2, \ldots$$

wherein x(t) is the (abstractly understood) state of a flow, u(t) control signal value, v(t) random flow disturbance, y(t) observed numerical flow characteristics, e(t) random measurement error, and θ vector of identified parameters of flow model.

The present invention can be viewed as an adaptive network control system attenuating disturbances (failures/attacks/anomalies/irregularities) caused by a selected class of phenomena, related to DDoS volumetric attacks, equipped with diagnostic mechanisms identifying and isolating sources of disturbances, acquiring (generating) knowledge (declarative and procedural) about the observed phenomena.

SUMMARY OF THE INVENTION

According to present invention, said adaptive method for creating rules for network traffic filtration on a network device that autonomously detects anomalies and automatically mitigates volumetric (DdoS) attacks, which, given observed network packet flows and their division into isolated packet flows, recognizes on at least one network device the potentially harmful network flows, and then configures or tunes network filters and packet policing means, the filtering rules of which can be propagated to other network devices, and selects for the purpose of further analysis the isolated packet flows associated with at least one configured or tuned network filter.

Method is executed periodically every set sampling period and consists of the following steps:

a) based on the data from the input and output interfaces, packets from observed network flows shall be sampled on at least one network device using at least one network traffic sampling unit, and packet samples shall be stored in the sample buffer.

b) The D detector, based on packet samples from the sample buffer, determines the 0 definitions of network filters isolating packet flows and stores the definitions in memory.

c) Each isolated packet flow has a defined threshold value in the flow observer unit and the threshold is stored in memory.

d) Then, for each isolated packet flow, the predicted features of the flows in a given prediction horizon are determined in the automatic flow control unit or in the flow observer unit and then saved in memory, wherein each new isolated packet flow is predicted by default values of flow features.

e) In addition, for each isolated packet flow, it is determined in the flow observer unit whether the previous threshold values as reckoned in the previous sampling period were exceeded through comparing the parameters of the isolated packet flow with the previous threshold values stored in memory, and if the previous threshold values were exceeded, alarm signals are generated and stored in memory.

f) Observed network flows that correspond to isolated packet flows that do not meet threshold values become subject to automatic control and their dynamic is shaped by automatic flow control unit with use of network filters and packet policing means.

Preferably, at step b), packet flows are isolated based on any of the available attributes of packet samples stored in the sample buffer, whereas the network filter definitions are stored in memory.

The process of flow control and flow dynamics shaping consists, in particular, in determining new control signals, by means of adaptive control algorithms, that adjust packet policing means based on current control signals and according to what follows.

Preferably, at step f), new control signals are determined by adaptive control algorithms based on packet samples from the input and output interfaces, that are taken from the sample buffer, threshold values, alarm signals, predicted flow characteristics, definitions of network filters and current control signals.

Preferably, step f) is followed by step g), wherein for isolated packet flows processed in the automatic flow control unit, packet filtering rules are constructed that are executed on at least one network device using network filters or packet policing means.

Preferably, at step g), the automatic flow control unit propagates the created packet filtering rules to other network devices.

Preferably, by use of the $D_0$ detector at step b), the network filters are being defined by:

determination of at least one ordered list, corresponding to the selected packet attribute in the set of packet samples available in the sample buffer, sorted in descending order according the selected flow parameters that constitute the set evaluation criteria, for each packet attribute, a summary list, obtained by aggregating the ordered lists, is determined and stored in the detector's memory, for each packet attribute placed on a summary list a base term is created and stored in memory, the activity counter is increased for each base term stored in memory, the memory activity counter value is checked, if at least one counter exceeds the set activity value, a network filter definition is created that corresponds to the base term at which the counter exceeded the activity value.

Preferably, the $D_0$ detector is called every set sampling interval (o1).

Preferably, the evaluation criteria are the number of bytes, the number of packets, the number of bits per second (bps), the number of packets per second (pps), the number of flows, or the average number of bytes in the packet (bpp) recorded every set sampling period.

Preferably, at steps c), d), e), f), either an observer unit or an automatic flow control unit creates a time series corresponding to the packet flows, isolated based on the definitions of stored network filters, describing changes in packet attributes over time, wherein each time series contains information about changes in any available attribute of packet samples stored in the packet buffer every set sampling period and stored in memory and used to determine flow characteristics at steps c), d), e) and f).

Preferably, step b) is followed by step b1), wherein the packet flow isolated by the $D_0$ detector is separated, using the first order detector $D_1$, into packet flows so that:

for each isolated packet flow, the corresponding time series are fetched from memory, the time series separated according to set characteristics are selected and reconstructed from the combination of time series corresponding to the packet flows isolated in the $D_0$ detector (7), Based on the combination of extracted time series, the composite terms composed of base terms are determined and the corresponding packet sub-flows are searched for in the packet samples stored in the sample buffer;

if a packet subflow described by the composite term exists in packet samples stored in the buffer, a new network filter definition is created that isolates the identified packet flow and is stored in memory.

Preferably, the selection of at least two separated time series is made according to maximal linear (orthogonal) independence or minimal correlation (stochastic independence) in the space of signals analyzed in the time domain or frequency domain.

Preferably, step b1) is followed by step b2), wherein isolated packet flows are separated using a higher order detector Di, based on a combination of lower order network filter definitions to create new higher order network filter definitions that isolate further packet flows:

for each isolated packet flow, the corresponding time series are fetched from memory, correlated or similar time series are selected according to another specified criterion, a new term is built, consisting of a product of terms building definitions of network filters isolating packet flows to which the detected correlated time series or similar time series correspond, and then the corresponding packet flows in packet samples stored in the sample buffer are searched for, corresponding to the new composite term, if a subflow described by a composite term exists in the collected packet samples, a network filter definition is created that isolates the identified packet flow and is stored in memory.

Preferably, at least two time series are qualified as similar because of their correlation with each other or because their shape similarity.

Preferably, at step g), appropriate attenuation of the network packet flow isolated by the network filter by packet policing means shall include the rejection of the packet.

Preferably, at step g), appropriate attenuation of the network packet flow isolated by the network filter by packet policing means shall include packet buffering.

Preferably, the individual steps in the process are carried out on different network devices or with at least one computer connected to the network via a suitable network interface.

In the present invention, the flow state is strictly defined by the definition of network filters and the current control signals stored in memory (16), the values of alarm signals or their absence, threshold values and predicted flow characteristics, and is controlled by an observer unit, starting with the state of flow being isolated by means of a suitable detector, through a state of flow being monitored by an observer unit, to a state of flow being controlled handled by the automatic flow control unit, or to the state of the flow being expired, handled by flow observer unit, wherein a specific value of filtration rules implemented on the network device by means of network filters and appropriate packet policing means is responsible for each of the listed states of flow.

An adaptive traffic filtering rule creation unit for one or more networked devices that autonomously detects anomalies and automatically mitigates volumetric attacks (DDoS), containing a memory, processor or controller and at least one interface, is characterized in that it:

contains a network traffic sampling unit for the input network interface and the output network interface, which performs the function of reading and collecting packet samples of the actual network flow and recording them in a dedicated sample buffer connected to a detector unit (D) isolating packet flows by reading packet samples stored in the buffer and 0 generating network filter definitions and storing them in memory. Memory is connected to an observer unit that reads from the memory information about network filters definitions and corresponding packet samples stored in the sample buffer and then sets threshold values and writes them to memory.

The observer unit determines whether the determined threshold values have been exceeded by comparing the parameters of the isolated packet flow with the previous threshold values stored in memory and if the previous threshold values have been exceeded, alarm signals are generated and stored in memory. In addition, the observer unit predicts flow characteristics within a given prediction horizon and saves them in memory. At the same time, memory is combined with an automatic flow control unit that regulates and shapes the dynamics of actual network flows that correspond to isolated packet flows that do not meet a set threshold, controlling packet policing means and network filters. At the same time, the automatic flow control unit is connected to at least one other network device to which it transmits the filter rules created according to network filters and signals read from memory and controlling packet policing means. Definitions of network filters and packet policing control signals are translated into packet filtering rules and sent to packet policing means and network filters to isolate packet traffic flows and shape their dynamics in a protected area of the network.

Preferably, the automatic flow control unit reads from memory alarm signals (predicted and observed), flow characteristics, network filter definitions, current signals controlling packet policing means and fetching threshold values. The automatic flow control unit is also combined with a sample buffer from which it reads packet samples from the input and output interfaces and adaptively determines new control signals for the packet policing means for the respective isolated packet flows and stores them in memory.

Preferably, between the sample buffer and the flow observer unit, there is a detector unit D0, which is connected in parallel to the first order detector unit D1, which is connected to memory.

Preferably, between the sample buffer and the flow observer unit, there is a detector unit D0, which is connected in parallel to the higher order detector unit Di, which is connected to memory.

Preferably, between the sample buffer and the flow observer unit, behind the D0 detector there is serially connected first order detector unit D1, which is connected to memory.

Preferably, between the sample buffer and the flow observer unit, behind the D0 detector there is serially connected higher order detector unit Di, which is connected to memory.

Preferably, the observer unit, based on network filter definitions, alarm signals and threshold values, triggers a first order D1 or higher order Di detector that isolates new flows and stores new network filter definitions.

Preferably, the observer unit, based on the definition of network filters, alarm signals and threshold values, is configured to activate an automatic flow control unit that controls and shapes the dynamics of the isolated packet flows indicated by the observer unit.

Preferably, the automatic flow control unit is configured to communicate with other network devices.

Preferably, individual unit elements may be implemented as application specific integrated circuits (ASICs) or as modules of a single integrated unit or as field-programmable gate arrays (FPGAs) or as a computer comprising at least a processor, memory, mass memory and associated network interface, and connected to at least one networked device.

The present invention is also the computer program product with program coding means, which are written on a computer readable medium, for the implementation of a method according to the invention, when the computer program product is executed on a computer.

Preferable Effects of the Invention

The developed solution is an adaptive (unsupervised learning) control system that independently and autonomously detects, tracks and mitigates non-stationary and multidimensional network traffic disturbances caused by volumetric DDoS attacks. The solution autonomously detects packet flows that pose a potential threat to the protected network, isolates them with a set of autonomously generated and distributed network filters with increasing resolution over time, identifies signal dynamics models of observed packet flows, and based on identified dynamics models, generates and adapts control algorithms that shape the dynamics of isolated flows, and calculates safe shares of isolated flows in the protected network bandwidth. The control process is carried out by a specially developed mechanism for managing the state of network flows.

The innovative nature of the developed solution to the problem of fast detection and effective mitigation of volumetric DDoS attacks with time-varying characteristics is a result of reducing this problem to the problem of signal processing and predictive adaptive control.

In this approach, packet flows are represented by appropriately defined signals (time series) that are treated as observed outputs of the process being controlled (the process of controlled transmission of network packets). The packet flows to be observed are selected in accordance with autonomously performed detection of signals that stand out from the rest of the network traffic. This task does not require a database of known attacks or knowledge of the typical features of monitored traffic. The invented system, thanks to the use of signal processing techniques, can independently detect signals requiring supervision and by what packet flows these signals are generated. As a result of this analysis, network filters are generated to isolate from the network traffic a set of packets requiring control. The accuracy of filters is iteratively increased (using signal processing techniques), which also increases the accuracy of isolation of potential attacks. The invented method of increasing the resolution of filters is to solve a properly defined task of signal separation and clustering, examining selected characteristics of signals seen in the time and frequency domain.

The aim of the system is to maintain isolated signals (i.e. packet flows) at the safe level and to shape their dynamics in order to guarantee the security of the protected network (preventing overload of connections and network services). However, the packet flows (signals) observed in the network are characterized by very complex dynamics of a random and time-varying nature. Such dynamics are typical for DDoS attacks, both known and unknown. Additionally, dynamics of packet filtering and queuing mechanisms is also complex. In each of the above cases, the dynamics models are not known a priori. For this reason, in order to accomplish the goal of control, the present invention learns a model of the observed traffic (within the seconds long sampling periods), and also adjusts rules of its operations (control) to the observed situation. The learning process consists in identification of dynamic models of isolated signals (i.e. predicted flow characteristics) and synthesis of control signals adjusted to the detected dynamics. Each network filter generated autonomously by the detector units, isolating packet flows, is connected with a traffic policing mechanism, e.g. a policer, and an adaptive algorithm for controlling (automatic flow control unit) its settings. It should be emphasized that the use of the traffic policing mechanism without the automatic flow control unit is not sufficient to achieve the assumed goal of network protection. The adaptive control algorithm for traffic policing mechanism precisely regulates the rate of packets matching the associated network filter. Such control allows for effective control and shapes the dynamics of the supervised flows. The goal of the control is to precisely limit the rate of the indicated packet flows. The goal of dynamics shaping is to admit flows of appropriate spectrum characteristics into the protected network, i.e. free from, for example, too sudden jumps in the flow rate (causing the queues to become saturated or the response times of network services to increase). Only this type of control allows for accurate management of free network link resources, and as a result, for effective protection of the network against overload. It should also be noted that the flow dynamics models used in this context make the following tasks possible:

making accurate short-term predictions, detecting anomalies difficult to notice in long-term statistics (e.g. related to coordinated communication processes or periodical features of algorithmically generated traffic), designing self-tuning control algorithms adapting to unknown a priori characteristics of network traffic and network devices.

Thanks to the approach used, the present invention does not require a collection of learning data or a long-term initial learning process. It is capable of operating from moment it is activated. None of the solutions available on market show the features of a system designed according to the recommendations of control theory, signal theory and the features of unsupervised learning system, that distinguishes the present invention. In particular, in contrast to known solutions, the present invention allows:

ensuring that the protected network is resistant to sudden changes in the dynamic characteristics of attacks, protecting against volumetric attacks with unknown/non-existing signatures, maintaining high availability of services in the presence of large-scale volumetric attacks (including wide area networks), rapidly identifying, isolating and mitigating the flows saturating protected links, unsupervised operation, the unit autonomously selects the flows that need to be monitored, predicting volumetric attacks, extracting knowledge about new attacks as generated through frequency analysis and analysis of dynamics models, identifying the dynamics model of traffic policing units (packet policing means) by network devices, optimizing automation of network traffic data processing, minimizing attack response time, data processing time, calculation and configuration changes of network devices, accurate and stable control of the packet flow rate under uncertainty, obtaining the results of operations with guaranteed quality indicators related to the effectiveness of attack detection and the effectiveness of shaping the dynamics of network flows, increasing the resistance of protected services to attack by selective rejection of packets and shaping the dynamics of their transmission, cleaning of traffic inside the client's network or directly on the client's device, privacy protection by limiting inspection to layers L2-L4 only, reducing costs by local cleaning of traffic and extension of the functionality of client devices installed in the network, transparent operation and installation of the system which does not require any modifications to the network architecture or routing policies, possibility of implementing the solution in most popular network environments (e.g. flowspec+xFlow, netconf+ xFlow, ssh+xFlow) thanks to the flexibility and transparency of the invented architecture.

BRIEF DESCRIPTION OF THE FIGURES

The object of the invention in one embodiment is shown in a series of figures, wherein.

DETAILED DESCRIPTION OF THE INVENTION

Figure 2:
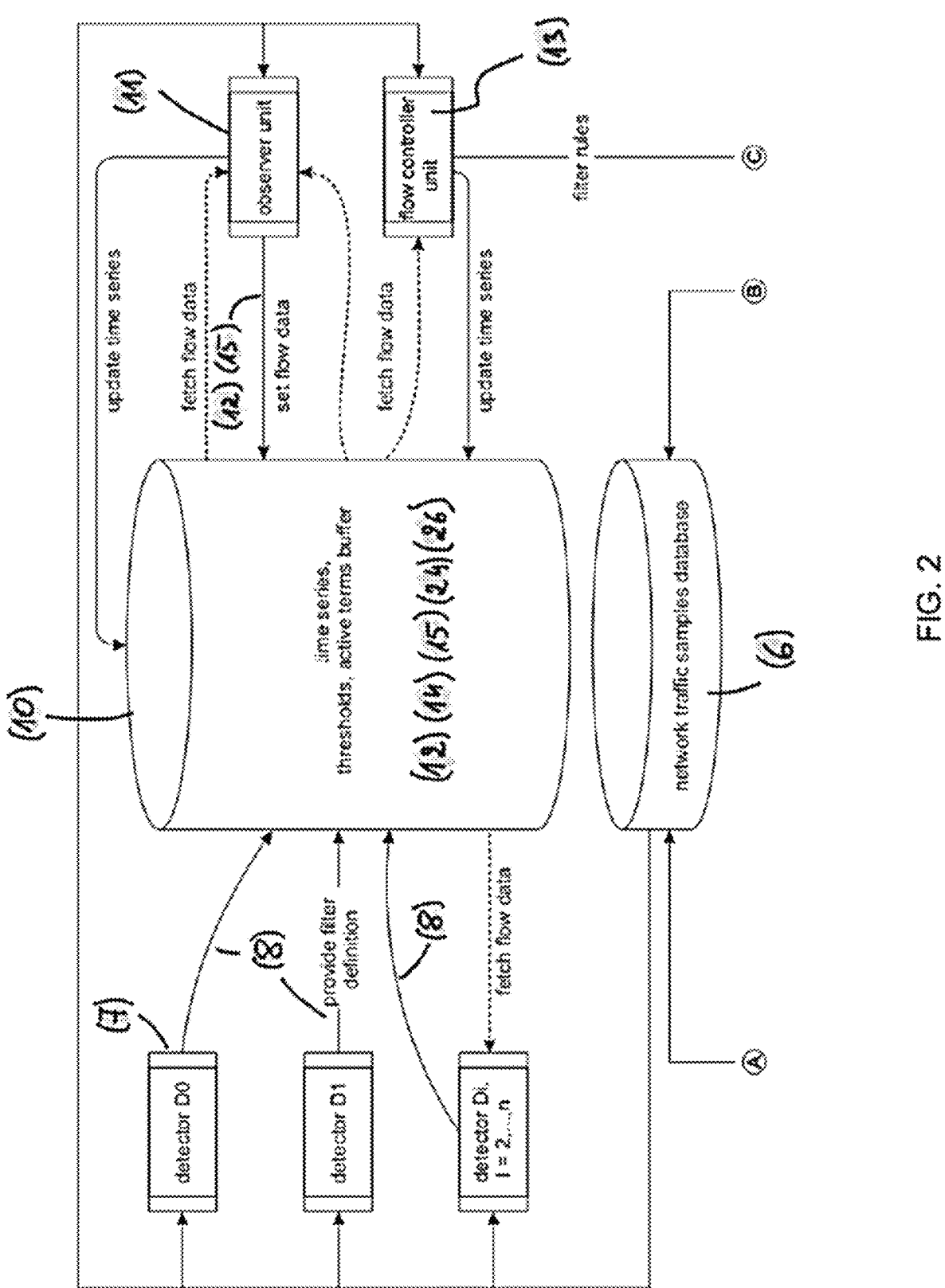
FIG. 2 shows the embodiment of a system.

Method autonomously detects actual network flows 3 that pose a potential threat to the protected network on at least one network device 4, isolates packet flows 9 using a set of autonomously generated and distributed definitions 8 of network filters. The network filter definitions 8 are used to configure the network filters 19 on at least one network device and can be distributed to other network devices 27 using dedicated control protocols such as BGP (Border Gateway Protocol). The system generates definitions 8 of network filters and configures network filters 19 with increasing resolution over time, identifies signal dynamics models of representation of observed packet flows, and based on predicted flow characteristics, 14, i.e. identified dynamics models, generates and adapts control signals 16 shaping the dynamics of isolated flows using packet policing means 17, and calculates safe shares of isolated flows in the protected network bandwidth by setting thresholds 12. Control signals 16 shaping the dynamics of isolated flows and definitions 8 of network filters isolating network flows 9 constitute together the filtration rules 18. The diagram of method is shown in FIG. 2.

According to one embodiment, method starts with sampling the packets. Based on data from input interface 1 and output interface 2, packets from actual network flows 3 are sampled. Traffic data comes from a sampling unit 5 of network device 4, but may also come from multiple devices and be transmitted to a selected network device with a unit according to the invention or a computer with a network interface adapted to perform the various steps of the process according to the invention. At least one sampling unit 5 of network traffic on at least one network device 4 records packet samples a1 in sample buffer 6.

The range of packet sampling data stored in sample buffer 6 depends on the packet sampling standards used (e.g. sFlow or netFlow). Any of the available x1 attributes can be applied to isolate packets, e.g. t-start, t-end, duration, src address, dst address, src port, dst port, protocol, flag, src as, dst as, tos, mac address, packet samples a1 stored in the sample buffer 6.

Based on packet a1 samples from sample buffer 6, the detector D0 7 determines the definition 8 of network filters isolating packet flows 9, which are stored in memory 10. The D0 detector isolates from the observed set of packet a1 samples of network traffic flows distinguished by the given traffic statistics, e.g. bps, pps, flows, bpp. Isolated packet flows 9 are described by the definition of network filter 8, which in the case of detector D0 7, distinguishes one single packet attribute x1, e.g. IP address or protocol type.

Figure 8:
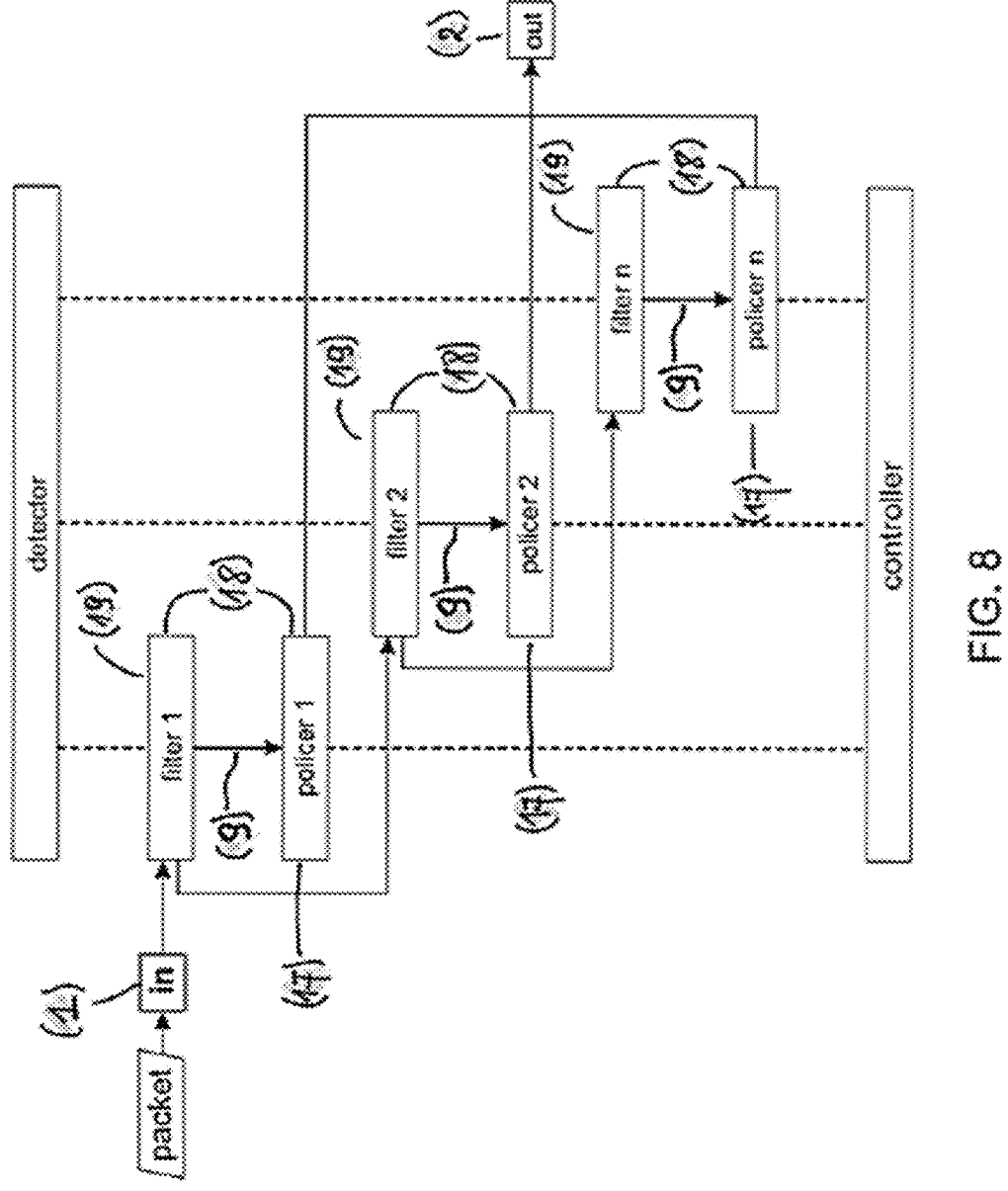
FIG. 8 shows an exemplary implementation of mechanism for isolation and policing flows.

For each isolated packet flow 9 through any detector D0, D1, Di, a process is created in the automatic flow control unit 13. The automatic flow control unit 13 is the controller responsible for the control process whose task is to shape the dynamics of actual network flows 3 between the input and output interfaces (in the dirty-clean unit) by updating the control signals 16, and, consequently, updating the filter rules 18. The diagram of the flow insulation unit, in which, on the one hand, the result of the detectors' operation provides the definition 8 of network filters, and, on the other hand, the automatic flow control unit is used to adjust control signals 16, is showed in FIG. 8. The operating diagram of the automatic flow control unit is showed in FIG. 1.

According to one embodiment, in each iteration of the adaptive control process performed, the model of flow dynamics is identified every of sampling period. The sampling period can be from 0.1 s to 15 s, preferably 5 seconds in this example.

In the flow observer unit 11, for each isolated packet flow 9, threshold values 12 are determined and stored in memory 10. In the flow observer unit 11 or in the automatic flow control unit 13, predicted flow characteristics 14 are determined within a given prediction horizon. Designated flow features are then stored in memory 10, while each new isolated packet flow 9 is predicted by default set values.

If the previous thresholds 121 determined in the previous sampling period of have been exceeded, after comparing the parameters of the isolated packet flow 9 with the previous thresholds 121 stored in memory 10, the alarm signals 15 stored in memory 10 are generated.

Figure 1:
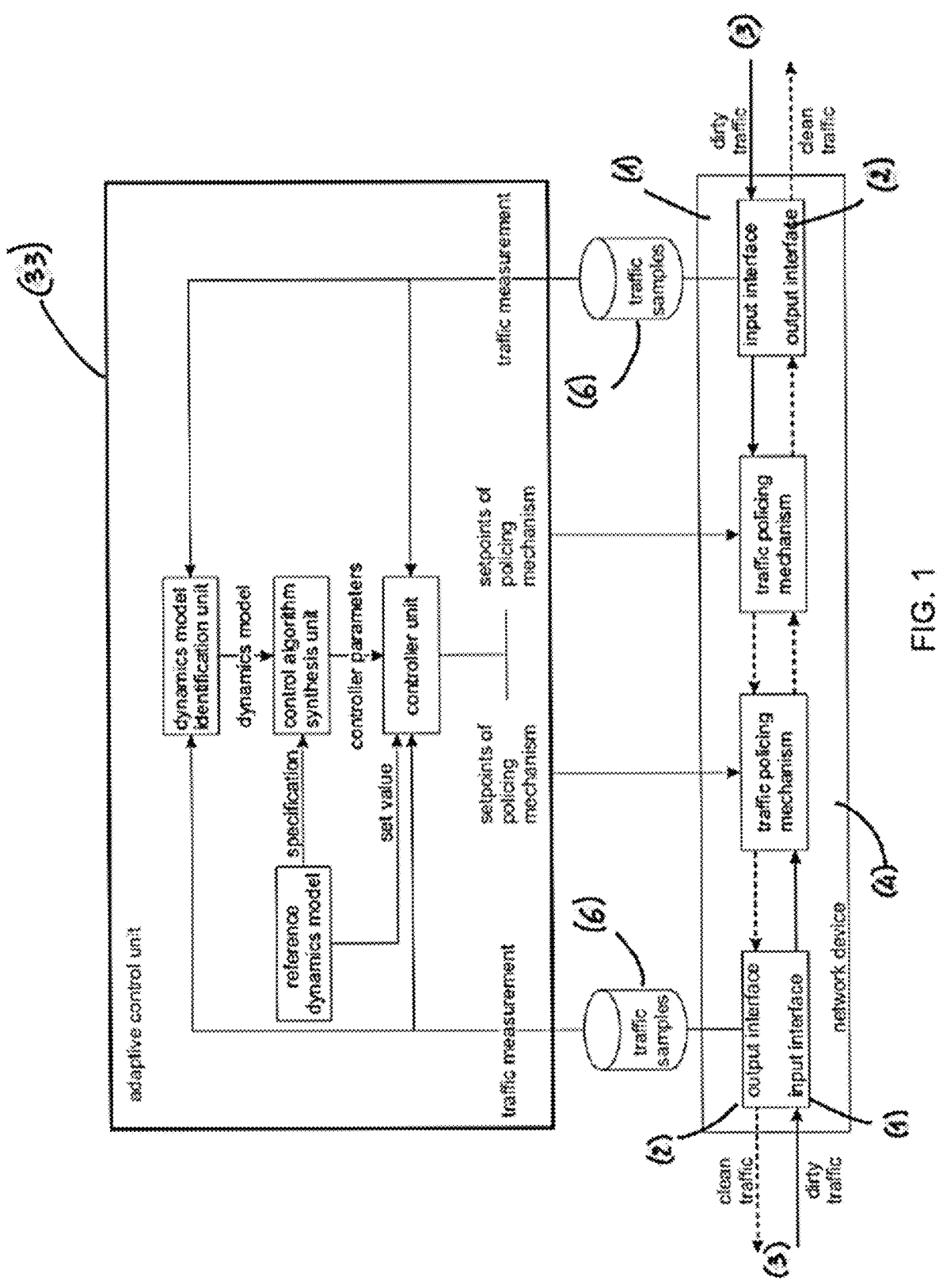
FIG. 1 shows a diagram of an exemplary installation of an adaptive flow controller unit—an embodiment of a unit implementing a link protection method using an adaptive control system.

Then, for the identified dynamic model, i.e. the predicted flow characteristics 14 of isolated packet flows 9, a synthesis of algorithms for determining control signals 16 and algorithms for predicting flow characteristics 14, e.g. network traffic intensity, is carried out. The appropriate configuration of the network device 4 allowing for control (mitigation) is designed autonomously, taking into account the specification set by the unit administrator. Determination of control signals 16 is a pattern for shaping the dynamics of packet flow and defines the basic parameters of the process of attenuation of anomalies or attacks with the use of packet policing means 17. FIG. 1 shows a block diagram of the solution according to the invention.

Actual network flows 3, which correspond to isolated packet flows 9, which do not meet the threshold 12, i.e. generate alarm signals, are autonomously adjusted and have dynamics shaped using an automatic flow control unit 13 and packets policing means 17 and network filters 19.

The automatic flow control unit 13 contains control mechanisms that cyclically, every set sampling period o1 of network traffic, determine successive values of control signals controlling for packet policing means 17, i.e. parameters of a policer or shaper (e.g. token-bucket algorithms), based on the predicted and observed responses of packet sources to imposed rate limits.

The purpose of the disclosed control process is to shape the flow dynamics in accordance with the specifications set by the system operator, e.g. attenuation of components with a given signal band associated with a selected packet flow. The solution allows for prediction and early mitigation of DDoS attacks, correcting the work of packets policing means 17 or otherwise mechanisms of sending packets of network devices (policers and shapers), as well as conducting advanced diagnostics of network traffic dynamics based on the analysis of predicted flow characteristics and dynamics models obtained based on them. Controlling the work of the packets policing means 17 (police/shapers) is a key element in the process of mitigating an attack. It allows obtaining the required speed and accuracy of attenuation, as well as shaping the (time and frequency) characteristics of the flow according to the accepted assumptions, defined by the operator.

The adaptive regulator in the form of an automatic flow control unit, by selecting control signals 16 for packets policing means 17, a policer or a shaper, for example, parameters of token-bucket algorithms, is designed to protect the link covered by the unit, e.g. maintaining the flow speeds at safe levels. The task of determining safe levels (upper limits) of the flow rate is performed autonomously by mechanism of reckoning the set threshold values 12, which are then used to perform the control. Threshold values 12 are computed in the flow observer unit 11 and in the automatic flow control unit 13 based on the solution of the non-linear optimization task, which determines the fair distribution of resources in the protected network. The resulting upper limits on the speed of packet flows ensure that the protected link is not saturated and its utility is maximized from the perspective of each flow. They are also used in the process of automatic flow control. Exceeding the flow rate upper limit triggers alarm signals 15 that affect the unit's decision to subject the flow to automatic dynamics shaping in the automatic flow control unit 13.

The automatic flow control unit taking into account packet samples from input interface 1 and output interface 2 taken from sample buffer 6, threshold values 12, alarm signals 15, predicted flow characteristics 14, definition 8 of network filters and current control signals 16, determines by adaptive control methods, new control signals 161 for packet policing means that are stored in the memory 10.

Selected packet samples from input 1 and output 2 taken from sample buffer 6 corresponding to isolated packet flows 9, threshold values 12, alarm signals 15, predicted flow characteristics 14, definitions network filters 8 and current control signals 16 are also stored in memory 10. Memory 10 can, in particular, be organized as a flow (time series) database. The automatic flow control unit uses a flow database containing data on medium term distribution of traffic on the link. Thanks to the applied solution, the network administrator does not have to calculate independently the orders limiting the speed of each monitored flow, the invented unit performs this task autonomously while working, and access to data is provided by a database.

The automatic flow control unit 13 is responsible, in particular, for creating a hardware abstraction layer and provides translation functions for logical formulas in the form of control signals 16 and the definition 8 of network filters. The abstraction layer mediates communication between master control layer and the network infrastructure layer of the unit. It is responsible for mapping the state of network switches and other network devices in the control layer and for transmitting control signals between layers. The automatic flow control unit 13 is also responsible for converting filter rules expressed in the language of reading traffic samples (e.g. pcap-filter) into filter rules for the network device operating system. The applied solution allows for automatic configuration of filtration tools and flow shaping tools on network devices (e.g. network client), as well as for implementation of advanced network control concepts using machine learning tools and artificial intelligence (SI). The automatic flow control unit 13 can also propagate the created filter rules 18 to other network devices.

For isolated packet flows 9 processed in the automatic flow control unit 13, control signals 16 are used to create filter rules 18, which are executed on at least one network device 4 using network filters 19 or packet policing means

17. By executing on a network device 4, it is understood that the control signals 16 and network filters 8 definitions are used to appropriately configure the available packet policing means 17 and network filters 19 so that the actual network flows 3 are filtered and dynamically modelled. What is more, automatic flow control unit 13 can propagate filter rules 27 to other network devices, e.g. using the BCP protocol.

The invention according to one embodiment registers and stores the characteristics of monitored network flows, such as definitions 8 of network filters, threshold values 12, predicted flow characteristics 14, alarm signals 15, control signals 16, in the database of time series 26 supported by mechanisms invented for this purpose to manage the state of network flows of the flow observer unit 11.

Individual units responsible for utilizing the invention may be implemented as application specific integrated circuits (ASICs) or as modules of a single integrated unit or as field-programmable gate arrays (FPGAs) or as a computer, consisting at least of a processor, memory, mass memory and appropriate network interface connected to at least one networked device. In particular, individual units may be software modules performing a function on a suitably configured networked device or computer, consisting of at least a processor, memory, storage and an appropriate network interface connected to at least one networked device, as a computer program product with program coding means which are written on a computer readable storage medium, so as to perform the method when the computer program product is executed on a computer. In addition, software modules may be distinguished processes running in the operating system of a suitably configured network device or a computer with a network interface.

Figure 3:
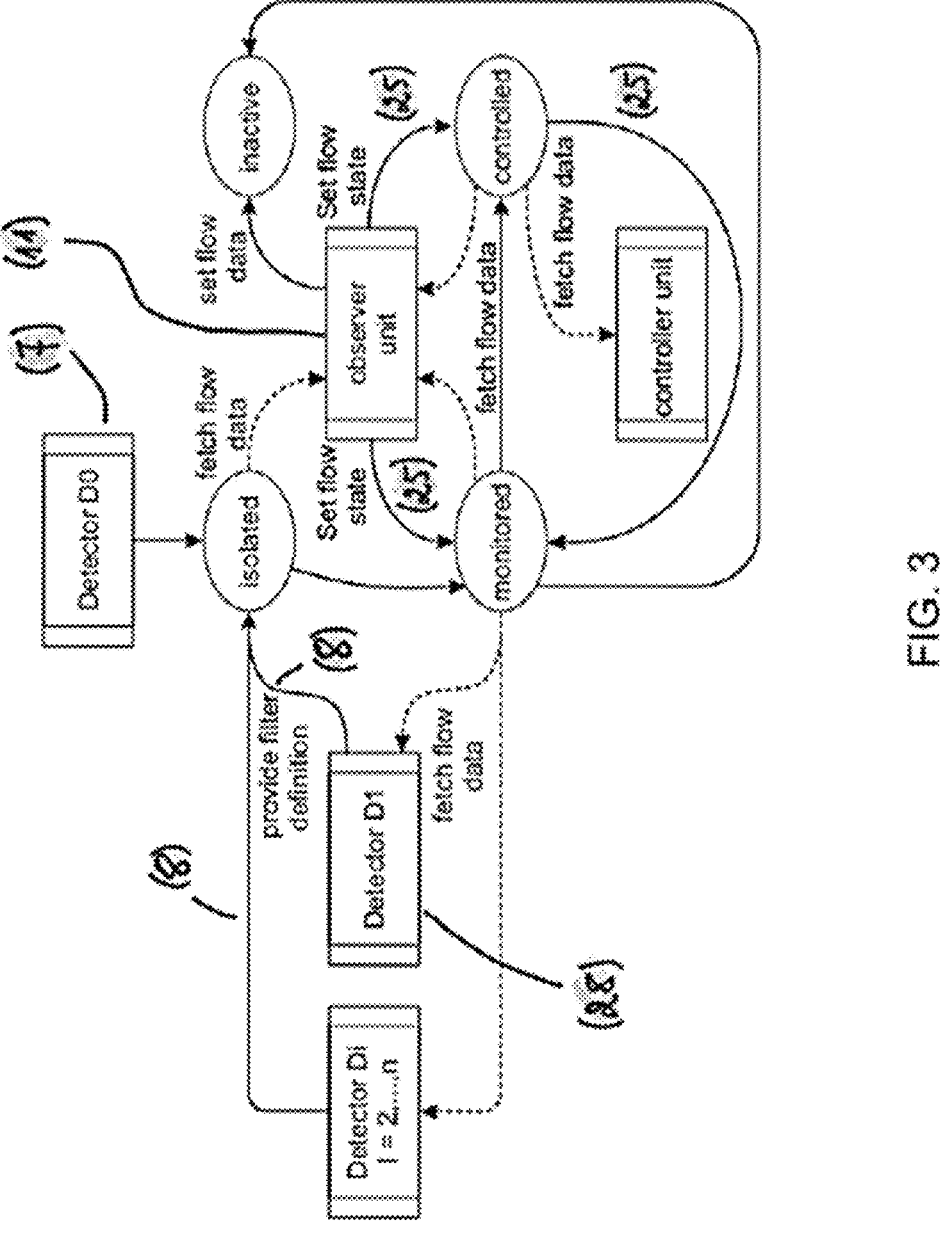
FIG. 3 shows the method defined by the diagram of states of observed flows.

According to one embodiment, the flow management method facilitates effective monitoring of the protected network security and improves the response to security incidents. The sample unit analyses the information contained in the traffic samples received from at least one network device 4 or selected network devices. The analysis is carried out by the units of detectors, D0, D1, Di and flow observer unit 11 (observer). When any sensor detects a pattern of network traffic requiring monitoring, an object representing a set of packets matching the detected pattern is created in the unit. This object is also called an 'isolated packet flow' 9. The flow is strictly defined by the 8 definition (pattern) of network filter created from packet header attributes (terms) and generated by any of the system's detectors. An object created in this method can be in one of four states during its life in the unit. The four flow states are: isolated state of flow sw, monitored state of flow so, controlled state of flow st and expired state of flow se. The transition between the states can be described as a finite state machine, whose graph of states is showed in FIG. 3. The flow observer unit 11 (observer) is responsible for the change of the flow state.

The flow introduced into the database by any Di detector is isolated. This is the initial state of a flow from which it is autonomously moved by the flow observer unit 11 (observer) to the monitored state. The flow in this state is sampled (with a set sampling frequency) by the flow observer unit 11, which analyzes packet headers and calculates their signal representation, as well as time and frequency characteristics. The collected measurement results are recorded every sampling period in the flow database. At the same time, the observer process checks the conditions for changing the state of each registered flow. The transition condition is the logical product of the alarm signals that are generated for each flow in the unit. Alarm signals indicate that the supervised network flow signal has violated set limits, e.g. related to an autonomously identified upper limit of its value or a change in power in a selected part of its spectrum. If the flow conditions for mitigation are met, the flow observer unit 11 changes the flow state to controlled state. The flow in controlled state is sampled (at a set sampling rate) by the sampling unit 5. However, for the flow in this state, the automatic flow control unit (controller) also creates on the network device a network filter 19 for packets and configures the packet policing means 17 to shape the flow dynamics. Calculated control parameters and measurements of observed characteristics are recorded in the database every sampling period. A flow in a controlled state whose characteristics do not contravene the safety standards may be switched by the flow observer unit back again to the monitoring state. From this state, the flow can also return to the controlled state. A change of state occurs and is stored in the database if the safety standards are violated again. The flow rate can change several times between monitoring and control states.

If the flow in monitoring state meets the safety conditions, it will be moved by the flow observer unit 11 to the expiry state. In this state, monitoring of its parameters is finished and the data concerning this flow is deleted from the unit.

Figure 4:
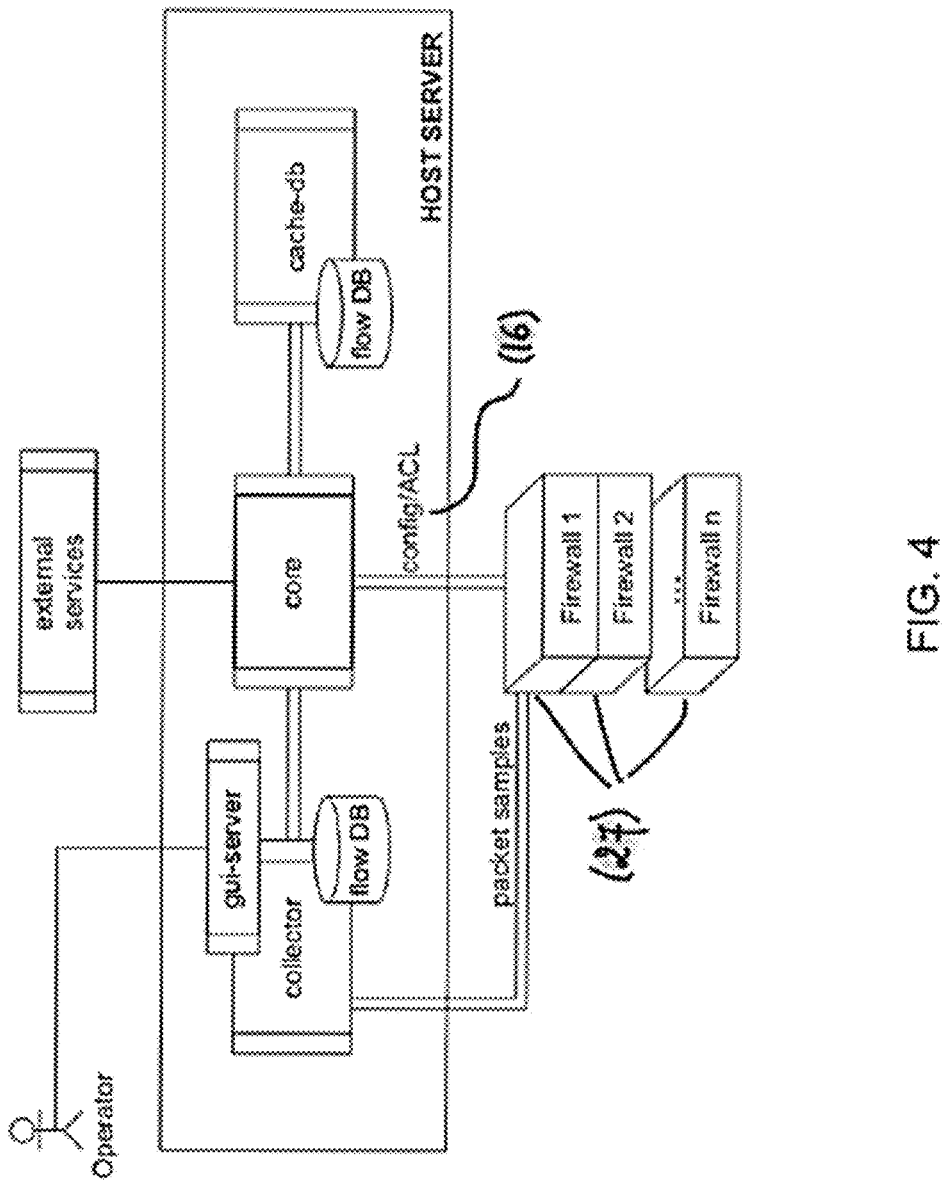
FIG. 4 shows the system using a properly configured database and virtualized services, i.e. independent of the protected network area and/or network device.

An embodiment of the unit implementation with the use of the database is showed in FIG. 4.

The control process according to the embodiment of the invention is implemented by managing the flow states s1 of the network. Each of the listed flow states s1 is responsible for a specific value of filtration rules 18 implemented on the network device 4 by means of network filters 19 and packet policing means 17. The flow observer unit 11 is responsible for the transition between states and current state control. Flow state s1 is strictly defined by values stored in the definition memory 8 of network filters and current control signals 16, values of alarm signals 15 or their absence, threshold values 12 and flow dynamics model 14. The embodiment of an invention describing the process of controlling with the use of flow states s1 does not limit the invention to the distinguished states only. The control process can be described in a completely different method while retaining key functionalities. The control process consists of the following actions:

automatic and autonomous identification of isolated packet flows requiring monitoring and identification of disturbances in monitored packet flows, automatic isolation of sources of disturbances (attacks) by creating and sending to network devices a configuration describing the filtering rules 18 of filtered network flows 3, identification of a flow dynamics model and a packet policing mechanism dynamics model in order to calculate traffic volume predictions for each flow based on an identified dynamic model, creating predicted flow characteristics 14, adaptive attenuation of isolated disturbances (attack mitigation) dynamically tuning parameters of packet filtering rules 18, shaping the dynamics of selected network flows 3 in a way that prevents saturation of protected links.

The above process is carried out periodically at a set sampling rate in the of sampling periods, which can take values from 1 s to 15 s, for example. The sampling periods may vary from one unit to another, but the sampling unit 5 should then have the specified sampling period greater or equal to the longest sampling period or the smallest common multiple of the different sampling periods. The different sampling periods may be, for example, a period of 1 s for flow observer unit 15 and a period of 5 s for automatic flow control unit 13. The adaptive control system, according to the invention, creates a closed control loop with at least one network device 4 (e.g. switches or routers), using packet samples a1 from the output interface 2 as feedback signals to control network traffic load requiring supervision by means of synthesized filter rules 18. Based on the feedback signals, the dynamics of the actual network flows 3 potentially threatening the protected links are formed. Importantly, packets included in the formed network flows 3 are not rejected in their entirety, but are sent in a quantity that guarantees the security of the protected network. The safe share of controlled network flows in the total network traffic is calculated autonomously based on the solution of the fair link-sharing problem. An embodiment of its implementation is shown in FIG. 2.

The system communicates with the network devices connected to it (switches, routers), wherein it must consist of at least one network device 4, every specified sampling period in order to take packet samples of a1 network traffic from the indicated interfaces and configure packet filtering rules 18. These tasks are performed using standard protocols and remote configuration functions of the network device provided by the hardware manufacturer (e.g. netconf, flowspec).

According to another embodiment, the implementation of method in line with the invention on a network device 4 transforms said network device 4 (e.g. switch or router), equipped with network input 1 and output 2 interfaces, standard sampling units 5, network filters 19 and packet policing means 17 for conditional packet forwarding (policing/shaping), into an advanced device shaping the dynamics of packet flows (observed in layers L2-L4 of OSI). The extension of the functions of network device 4 can be achieved by modifying the architecture of the device with the necessary units according to the invention or by implementing the appropriate procedures according to the SDN architecture. The applied network engineering method distinguishes on the network device 4, two types of network interfaces:

Input interface 1, dirty type: interfaces accepting packets to be analyzed by the system, Output 2 interface, clean type: interfaces that send packets analyzed by the system, providing to the unit a feedback signal that illustrates the effectiveness of the system's actions.

The system fetches samples (e.g. sFlow or netFlow) of a1 packets on both interface types (1, 2). Samples from dirty type 1 input interface are used to isolate packet flows 9, sets of packets matching the pattern autonomously built by the system, requiring observation (potential attacks) and creating in the system, a network traffic model associated with the observed actual network flow of 3 packets. Based on the identified packet flow model (dynamics) and predicted flow characteristics 14, the system makes further decisions about the rate of packet transfer forming the network flow.

Figure 5:
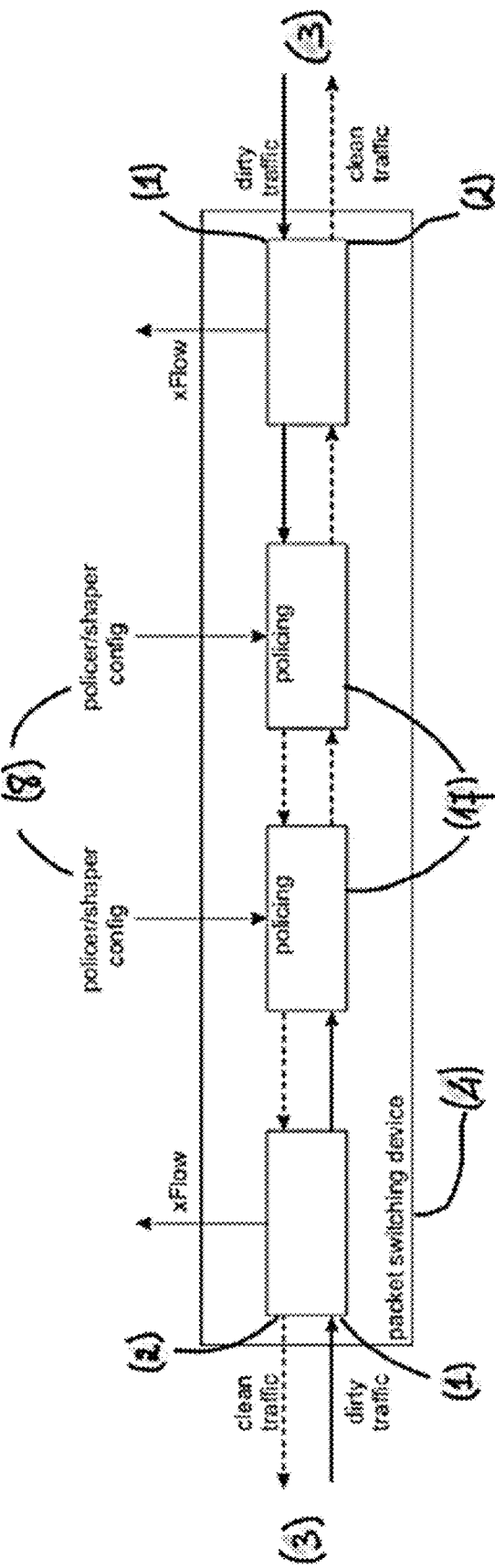
FIG. 5 shows a layout of dirty-clean interfaces with a pair of internal interfaces performing tasks of shaping flow dynamics using packet policing means.

Packet samples from the clean 2 output interface are used by the unit to determine the effectiveness of the flow rate shaping process. Shaping of flow dynamics is performed by means of filtering rules 18 (policing/shaping) established on dirty interfaces or on interfaces between dirty-clean interfaces. An example of a dirty-clean control system is shown in FIG. 5

Transparent network architecture based on OSI Layer L2-L4, using widely available network technologies, allows easy connection of client devices to input and output interfaces for packet distribution. The use of advanced network engineering methods allows performing system services even on a single network device 4, transforming a firewall into a smart network protection device.

In contrast to solutions based on signature (pattern matching, rule-based) techniques, which are known from the state of art, and compared to the observed network traffic to known patterns, the invented mechanism uses signal processing techniques to perform the tasks of automatic building of filtering rules 18 isolating the actual network flows 3 requiring monitoring.

According to the invention, detection of anomalous flows in network traffic or in a DDoS attack carrier is based on the analysis of a set of packet a1 samples, including data from layers L2-L4 of the OSI model, flowing through the observed input interface 1. The unit consists of interconnected detectors, at least one D0 detector, wherein at least one first order D1 detector and/or at least one higher order Di detector is preferable in the unit. The D0 detector extracts from the observed set of packet samples a1 of network traffic, the flows that stand out due to the given traffic statistics, for example, the number of bytes, the number of packets, the number of bits per second (bps), the number of packets per second (pps), the number of logical flows or the average number of bytes in the packet (bpp) recorded every set sampling period of o1.

Isolated packet flows 9 extracted in this way are described by the definition of a network filter 8 composed of a single base term 23 (containing a single attribute of a packet x1, e.g. a target IP address or protocol type). The detector performs a multi-criteria analysis of the observed data to isolate flows that have the characteristics of an anomaly in network traffic or attack. For this purpose, a multiple voting mechanism is used, in which candidates (in parallel elections) are flows defined by a single base term 23 (first list of candidates: dst ip A, dst ip B, second list: src port A, src port B, etc.), and voters of traffic statistics (bps, pps, flows, bpp, etc.).

The lists ordered by the voters from the candidate list are aggregated by the D0 detector to the summary lists 21, which combine flows that stand out in many ways at the same time. In this way, a set of base terms 23 is created, which correspond to the flows potentially requiring further observation. For each base term 23 stored in memory 10, the activity counter 24 is increased. The value of activity counter 24 in memory 10 is then checked. If at least one counter exceeds the set activity value 25, a definition of network filter 8 is created that corresponds to base term 23, whose counter exceeded the required activity value 25. Detector D0 is run cyclically every set sampling periods of o1.

To improve the detection of flows that require observation, it is preferable to use the representation of packet samples a1 in the form of time series 26, which describe the changes in the attributes x1 packets over time, while each time series 26 contains information about changes in any available attribute x1 of packet samples a1 stored in the packet buffer 6 over a given sampling period o1. The time series 26 are used to determine the predicted flow characteristics 14 of flows, to build dynamic models and to detect flows in detectors. The time series are created by either flow monitor 11 or automatic flow control 13 and correspond to the isolated packet flows 9 by the definitions 8 of network filters stored in memory 10.

Based on a set of flows extracted by the D0 detector, the higher order detector, D1, builds a new, more precisely defined set of flows. This set consists of flows that are a combination of flows extracted by the D0 detector 7. This combination 8 of network filters is the solution to a properly defined signal separation task. For each packet flow 9 isolated by D0 7, the corresponding time series 26 are taken. Then the time series 26 separated by the set characteristics are selected and the combination of previously isolated time series is determined. At least two 26 time series separated from each other are selected either because of maximum linear (orthogonal) independence or because of minimal correlation (stochastic independence) in the signal space 26 in the time domain or frequency domain. Determination of the combination of separated time series 26 includes calculating matrix mixing the time series 26 corresponding to the base terms 23 (created by the detector D0 7). To calculate mixing matrix, typical techniques of signal analysis in the time and frequency domain, known to persons skilled in art, are used. A mixing matrix is then used to synthesize composite terms 32 of base terms 23, and the corresponding sub-packet flows 29 are searched for in the packet samples a1 stored in the sample buffer 6. In the collected traffic samples, the D1 detector searches for flows being the logical product of the terms corresponding to the distinguished elements of mixing matrix. If the subpacket flow 29 described by composite term 32 exists in packet samples a1 stored in the sample buffer 6, a new definition of network filter 8 is created, which isolates the identified packet flow 9 and is stored in memory 10. Filters created in this method increase the resolution of flow observation, i.e. they divide the traffic distinguished by the D0 detector into components requiring monitoring. Detector D1 performs operations cyclically every set sampling periods of depending on whether detector D0 has isolated new packet flows or on the state of the flows analyzed by the flow monitor 11.

The higher order Di detector then builds a new subset of flows by analyzing observed flows directed to cluster time series 26, but this time based on a subset set by any other detector, preferably for at least one D1 detector. The higher-order detector shall select time series 26 correlated or similar according to another specified criterion, e.g. because of their similarity in the form of the time series 26, i.e. the proximity determined by the DTW method (dynamic time warping). The new definitions 8 of network filters are the logical product of the terms building the definitions of D1 detector network filters, which form an identified cluster. New composite term 32 is a product of terms building definitions 8 of network filters isolating packet flows 9 of packets, which correspond to the detected correlated time series or similar time series. If a subflow 29 described by composite term 32 exists in the collected packet samples a1, a definition 8 of network filter is created that isolates the identified packet flow of 9. As a result, the created network filter definitions 8 divide the traffic distinguished by any other detector, preferably by at least one D1 detector, into its components, increasing the resolution of the filtration. The Di detector is run cyclically at the set sampling intervals o1 of depending on whether another lower order detector has isolated new packet flows or depending on the state of the flows analyzed by the flow monitor unit 11.

Figure 6:
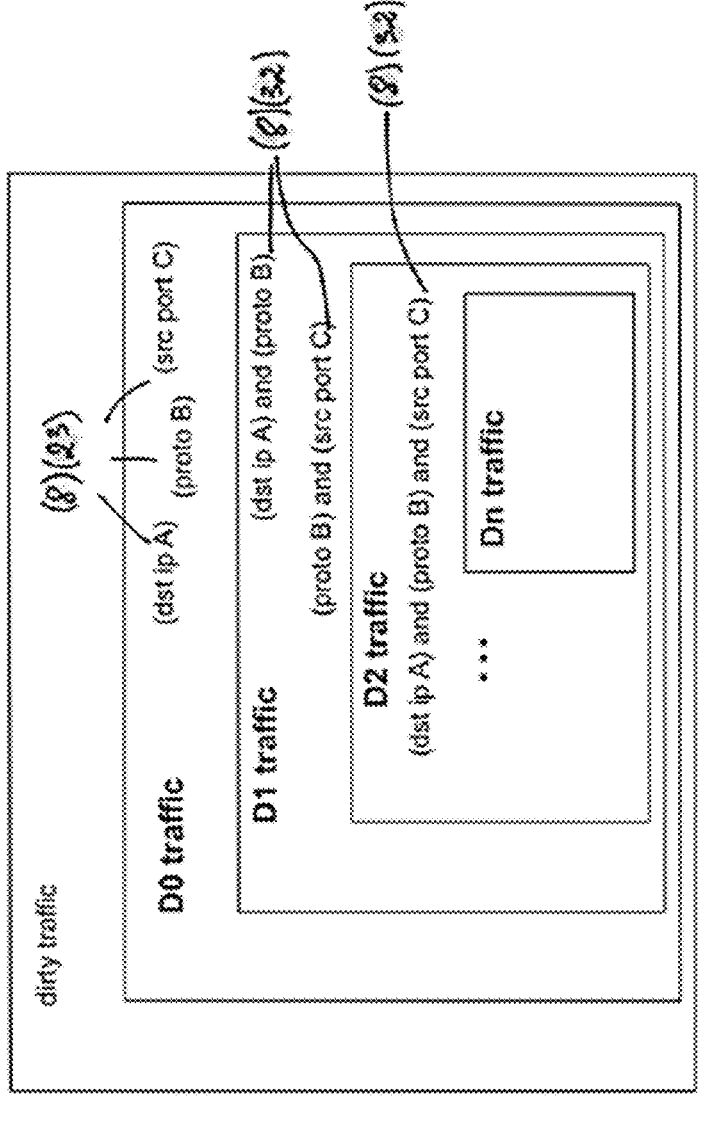
FIG. 6 shows the concept of a mechanism for increasing anomaly detection accuracy.

The procedure of increasing filtration resolution, using the analysis in time and frequency domain of the extended signal base in the form of time series 26 (reshowing packet flows), can be repeated in an iterative process, building a hierarchy of D0, D1, Di detectors, which, in subsequent steps, isolates from the observed network traffic, the actual network flows 3 through more and more precisely defined filtering rules 18. This mechanism is showed in FIG. 6

Figure 7:
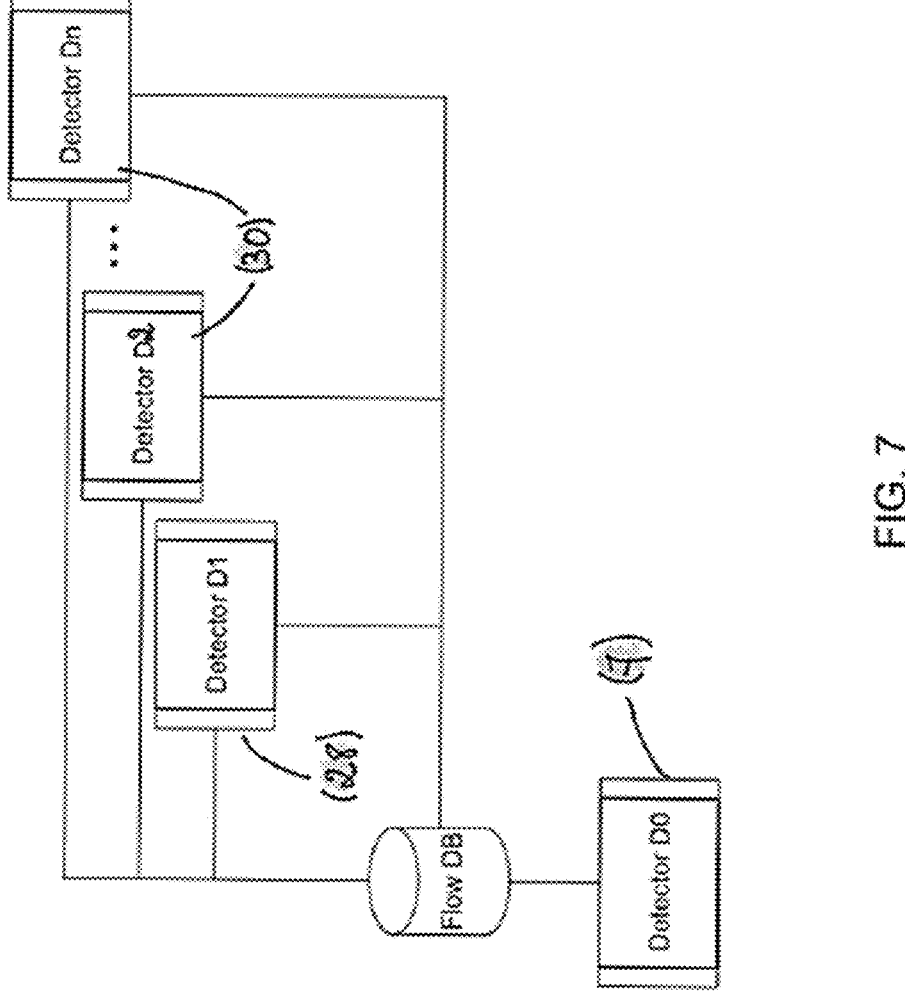
FIG. 7 shows an exemplary implementation of iterative mechanism for increasing anomaly detection accuracy.

The applied approach allows for autonomous detection of composite and time-varying attack vectors, as well as for adaptive construction of mechanisms mitigating composite attacks with variable dynamics. The diagram of iterative mechanism architecture for increasing detection accuracy is showed in FIG. 7.

According to one embodiment, the appropriate attenuation of the network packet flow isolated by a network filter 19 of network packets 3 flow by packet policing means 17 includes the rejection of the packet. Appropriate attenuation of network packet flow 19 isolated by a network filter 3 by packet policing means 17 includes packet buffering.

The individual steps in the process are carried out on different network devices or with at least one computer connected to the network via a suitable network interface. The sampling periods used for different network devices may vary from one network device to another.

An adaptive network traffic filtering unit, according to invention, for one or more networked devices that autonomously detects anomalies and volumetric attacks (DDoS), containing memory 10, a processor or controller and at least one network interface, further comprises a sampling unit 5 of input 1 and output 2 interfaces, a sample buffer 6, a detector unit D0 7, an observer unit 11, an automatic flow control unit 13, and packet policing means 17 and network filters 19. packet policing means 17 and network filters 19 may be located in the same network device or in another network device equipped with them.

Sampling unit 5 performs the function of reading and collecting packet samples a1 of actual network flow 3 and stores them in a dedicated sample buffer 6. This buffer is connected to the detector unit D0 7 isolating packet flows 9 by reading packet samples a1 written in the sample buffer 6 and generating definitions 8 of network filters and storing them in memory of 10. In addition, memory 10 is connected to an observer unit 11, which reads from memory 10 information about the definitions 8 of network filters and the corresponding packet samples a1 written in the sample buffer 6, and then sets the threshold values 12 and writes them to memory 10. Observer unit 11 also determines whether the determined threshold values 12 were exceeded by comparing the parameters of the isolated packet flow 9 with the previous threshold values 121 stored in memory 10, and if the previous threshold values 121 were exceeded, alarm signals 15 stored in memory 10 are generated. In addition, the observer unit 11 predicts flow characteristics 14 within the set prediction horizon and stores them in memory 10.

At the same time, memory 10 is combined with automatic flow control 13, which regulates and shapes the dynamics of actual network flows 3, which correspond to isolated packet flows 9, which do not meet the set threshold values 12 that control the packet policing means 17 and network filters 19. The automatic flow control unit 13 is connected to at least one other network device 27, which is configured so that it can be transmitted to them, based on network filters read from the definitions 8, memory 10 and packet policing means control signals 16, filtering rules 18. Network filters definitions 8 and packet policing control signals 16 are translated into packet filtering rules 18 and transmitted to packet policing means 17 and network filters 19, thereby isolating the packet flows of network traffic 3 and shaping their dynamics in the protected area of the network.

According to one embodiment, the automatic flow control unit 13 reads alarm signals 15 from memory 10, (predicted and observed) flow characteristics 14, network filters definitions 8, packet policing means current control signals 16 and fetches threshold values 12. The automatic flow control unit 13 is also connected to a sample buffer 6 from which it reads packet samples a1 from the input 1 and output 2 interfaces and adapts to the new control signals 16 of packet policing means for the respective isolated packet flows 9 and stores them in memory 10.

Between the sample buffer 6 and the flow monitor unit 11, there is a parallel first order D1 detector 28 connected to the D0 detector 7 and memory 10, or between the sample buffer 6 and the flow monitor 11, there may be a higher order Di detector 30 and memory connected to the D0 detector 7. In addition, the invention does not exclude the possibility that between the sample buffer 6 and the flow monitor unit 11, there is a first order D1 detector 28 serially connected to D0 detector 7, which is connected to memory 10, or that between the sample buffer 6 and the flow monitor unit 11, there is a higher order Di detector 30 serially connected to first order D1 detector 28, which is connected to memory 10.

The observer unit 11 can be configured so that, based on the definition 8 of network filters, alarm signals 15 and designated threshold values 12, it activates a first order D1 detector 28 or higher order Di detector 30 that isolates new flows 29 and stores the new definitions 8 of network filters in a memory of 10. In addition, the observer unit 11 based on the definition 8 of network filters, alarm signals 15 and threshold values 12 can be configured to activate the automatic flow control unit 13, which performs the function of control and the shaping of the dynamics of the isolated packet flow indicated by the observer unit 11. Additionally, the automatic flow control unit 13 is configured to communicate with other network devices 27.

INDUSTRIAL APPLICATION

The invention may be applied as an element of the unit of protection of ICT networks or network traffic exchange points. It can also be used, among other things, as a:

a tool for monitoring the state of network security, a tool for active response to network security incidents, a tool to generate knowledge about network flows, a decision support system for ICT security operators, a tool for controlling selected parameters of the quality of network services.

The invention claimed is:

1. A method of mitigating volumetric (DDoS) attacks by adaptive creation and adjusting of network traffic filtration rules, comprising:

within an observation horizon in time domain sampling packets of an input network traffic to select network packet's fields and containing attributes from the sampled network packets;

creating combinations of observed parameters for the observation horizon in the time domain;

creating network filtration rules of a first level DO based on combinations of observed parameters with a most statistical significance in the observation horizon;

creating network filtration rules of higher levels D1-Dn based on dynamic characteristics of the observed parameters in the observation horizon;

iteratively increasing a selectivity of the network traffic filtration rules by increasing a number of combinations of already observed parameters and newly observed parameters to configure new network filters of higher levels, to separate packet flows from packet flows already selected by filters of lower levels;

detecting anomalies within the packet flows isolated from the network traffic by the network traffic filtration rules;

recognizing, by a network device, potentially harmful packet flows capable of exhausting network resources or digital services and potentially forming a volumetric (DDoS) attack;

propagating, by the network device, calculated definitions of network traffic filtration rules based on an increased number of combinations of observed parameters to other network devices, thereby allowing the other network devices to isolate potentially malicious packet flows adaptively without prior knowledge (fingerprints) characterizing the packet flows;

adaptive tuning, by the network device, of network traffic policing mechanisms with calculated definitions of network traffic filtration rules based on an increased number of combinations of observed parameters, operating on the network device or other network devices, to mitigate volumetric (DDoS) attacks or limit rates of the isolated potentially harmful packet flows.

2. The method of claim 1, wherein creating network filtration rules of the first level D0 based on combinations of observed parameters with the most statistical significance in the observation horizon within given sample periods (o1) cyclically comprises:

a) based on data from input and output interfaces, packets from actual network flows are sampled on at least one network device using at least one network traffic sampling unit, and packet samples (a1) are stored in a sample buffer, wherein input and output interfaces mean:

the input interface mean interface accepting packets to be analyzed by the network device, the output interface mean interface that send packets analyzed by the network device, providing a feedback signal that illustrates the effectiveness of the network device's actions, b) based on packet samples (a1) from the sample buffer, using a DO detector, definitions of network traffic filtration rules that isolate packet flows are computed and stored in a memory, wherein the DO detector computes network traffic filtration rules through:

determination of at least one ordered list corresponding to a selected attribute (x1) of packets in a set of packet samples available in the sample buffer in descending order of selected flow parameters that constitute a set of evaluation criteria, for each attribute (x1) of the packet, a summary list is determined by aggregating ordered lists into a single representative list of attributes characterizing potentially malicious packet flows, and stored in memory, for each attribute (x1) of a packet placed in the summary lists, a base term is created and stored in memory, an activity counter is increased for each base term stored in memory, a value of the activity counter is checked in the memory, and if at least one activity counter value exceeds a set activity value, the definition of network traffic filtration rules is created that corresponds to the base term, the counter of which exceeded the set activity value, c) for each isolated packet flow, threshold values are defined in a flow observer unit and stored in the memory, wherein for each new isolated packet flow threshold values are preset with default set values, and creating combinations of observed parameters for the observation horizon in the time domain comprises:

d) for each isolated packet flow, predicted flow characteristics are determined on a set prediction horizon in an automatic flow control unit or in the flow observer unit and stored in the memory, wherein each new isolated packet flow is predicted using default set values, e) for each isolated packet flow, the flow observer unit determines whether previous threshold values, computed in a previous sampling period (o1) have been exceeded, by comparing parameters of the isolated packet flow with previous threshold values stored in the memory and if previous threshold values have been exceeded, alarm signals are generated and stored in the memory, f) for each isolated packet flow that does not comply with predefined threshold values stored in memory, the flow observer unit activates the automatic flow control unit, which adaptively controls and shapes dynamics of the isolated packet flow with use of packet policing means and network filters, wherein the automatic flow control unit for traffic policing mechanism precisely regulates a rate of isolated packet flow by updating configuration of packet policing means, wherein a process of adaptive control and dynamics shaping utilizes predicted flow characteristics.

3. The method of claim 2, wherein at step b), packet flows are based on any of the available attributes (x1) of packet samples (a1) stored in the sample buffer.

4. The method of claim 2, wherein at step f), based on packet samples from the input interface and output interface taken from the sample buffer, on threshold values, on alarm signals, on predicted flow characteristics, on definition of network filters as well as on current control signals, new control signals for packet policing means are determined by the automatic flow control unit and stored in memory.

5. The method of claim 2, wherein at step f) is followed by step g), wherein for isolated packet flows processed in the automatic flow control unit based on the control signals, filter rules are created that are:

performed on at least one network device using network filters or packet policing means.

6. The method of claim 5, wherein at step g), the automatic flow control unit propagates the created filter rules to other network devices.

7. The method of claim 5, wherein at step g) the according mitigation of the network packet flow isolated by the network filter performed by the packet policing means includes the rejection of the packet.

8. The method of claim 5, wherein at step g) according mitigation of the network packet flow isolated by the network filter performed by the packet policing means includes packet buffering.

9. The method of claim 2, wherein at least two time series separated from each other are selected either because of maximum linear (orthogonal) independence or because of minimal correlation (stochastic independence) in the signal space in at least two time series in the time domain or frequency domain.

10. The method of claim 9, wherein step b1) is followed by step b2), wherein isolated packet flows are split, using a higher order D1-Dn detector, by a combination of lower order network filter definitions, creating new definitions of higher order network filters that isolate further packet sub-flows:

for isolated packet flows, the corresponding time series of observed values are fetched from memory, and decomposed into components defining a set of characteristics of the corresponding time series, so that a new composite synthetic observed value is built from the product of the observed values building definitions of network filters isolating packet flows, which are matched by detected correlated time series or similar time series, and then flows corresponding to the new composite synthetic observed value are searched for in packet samples (a1) stored in the sample buffer, if the subflow described by the new composite synthetic observed value exists in the collected packet samples (a1), a network filter definition that isolates the identified packet flow is created and stored in memory, which as a result recursively increases the resolution of the computed network traffic filtration rules.

11. The method of claim 10, wherein step b) is followed by step b1) in which the packet flow isolated by the DO detector is divided by a first order D1 detector into packet subflows so that:

for each isolated packet flow, the corresponding time series of observed values are fetched from memory, the time series separated by the set characteristics are selected and the combination of separated time series corresponding to the packet flows isolated in the DO detector is determined, and based on the combination of extracted time series, composite synthetic observed values composed of base observed values are determined and the corresponding packet subflows are searched for in the packet samples (a1) stored in the sample buffer, if the packet subflow described by a composite synthetic observed value exists in the packet samples (a1) stored in the buffer, a new network filter definition is created that isolates the identified packet flow, and is stored in memory, which as a result recursively increases the resolution of the computed network traffic filtration rules.

12. The method of claim 9, wherein at least two time series are qualified as similar because of their correlation with each other or because they are similar in their waveform.

13. The method of claim 2, wherein the individual steps of the process are performed on different network devices or using at least one computer connected to the network via a network interface.

14. The method of claim 2, wherein the DO detector is run cyclically at the set sampling intervals (o1).

15. The method of claim 2, wherein in the set of evaluation criteria are the number of bytes, the number of packets, the number of bits per second (bps), the number of packets per second (pps), the number of flows or the average number of bytes in the packet (bpp) recorded every set sampling period (o1).

16. The method of claim 2, wherein:

at steps c), d), e), f), either the observer unit or the automatic flow control unit creates a time series that corresponds to each isolated packet flow by the definitions of network filters stored in memory that describe changes in attributes (x1) of packets over time, and wherein each time series contains information about changes to any available attribute (x1) of packet samples (a1) stored in the packet buffer for a set sampling period (o1) and stored in memory and used to determine flow characteristics as well as used at steps c), d), e) and f).

17. A non-transitory computer-readable medium comprising instructions that, when executed on a computer or networked device, implement a method according to claim 1.

\* \* \* \* \*